US012794406B2

(12) United States Patent
Blansette

(10) Patent No.: US 12,794,406 B2
(45) Date of Patent: Nov. 10, 2026

(54) VEHICULAR-MOUNTED DEPLOYABLE SOLAR ARRAYS

(71) Applicant: Intelligent Systems Mobile LLC, Carmel, IN (US)

(72) Inventor: Stephe Blansette, Carmel, IN (US)

(73) Assignee: Intelligent Systems Mobile LLC, Carmel, IN (US)

( * ) Notice: Subject to any disclaimer, the term of this patent is extended or adjusted under 35 U.S.C. 154(b) by 262 days.

(21) Appl. No.: 18/669,444

(22) Filed: May 20, 2024

(65) Prior Publication Data

US 2024/0429856 A1 Dec. 26, 2024

Related U.S. Application Data

(60) Provisional application No. 63/502,979, filed on May 18, 2023.

(51) Int. Cl.
*H02S 30/20* (2014.01)
*B60R 16/03* (2006.01)
*H02S 20/30* (2014.01)

(52) U.S. Cl.
CPC .............. *H02S 30/20* (2014.12); *B60R 16/03* (2013.01); *H02S 20/30* (2014.12)

(58) Field of Classification Search
CPC .......... B60R 16/03; H02S 30/20; H02S 20/30
See application file for complete search history.

(56) References Cited

U.S. PATENT DOCUMENTS 8,851,560 B1 * 10/2014 Freeman .................. B60J 11/04 180/2.2
2008/0223431 A1 * 9/2008 Chu ........................ H02S 30/20 136/245
2011/0291607 A1 * 12/2011 Rossi ........................ H02J 7/35 320/101
2012/0073885 A1 * 3/2012 Glynn .................... B60K 16/00 180/2.2
2017/0063290 A1 * 3/2017 Kurlagunda ............ B60L 8/003
2020/0321909 A1 * 10/2020 McGinty ................. H02S 20/32
2021/0188096 A1 * 6/2021 Yu ........................... H02S 10/40
2021/0194420 A1 * 6/2021 Magleby ................. H02S 30/20
2023/0148064 A1 * 5/2023 Trombley ................ B60J 7/141 320/101
2023/0158977 A1 * 5/2023 Howlett .................. H02S 20/30 307/10.1
2023/0173898 A1 * 6/2023 Dawson ................ B60R 16/033 296/100.06
2024/0088826 A1 * 3/2024 Luo ......................... H02S 30/20
2024/0146238 A1 * 5/2024 Cyrus ..................... H02S 30/20

* cited by examiner

*Primary Examiner* — Brian L Swenson
(74) *Attorney, Agent, or Firm* — Brannon Sowers & Cracraft PC; David E. Novak

(57) ABSTRACT

Vehicle-mounted solar arrays movable between a stowed position (for when the vehicle is in operation) having a smaller available surface area and a deployed position (for when the vehicle is parked) having a larger available surface area are disclosed. Electrical power may be generated in either the stowed or deployed positions, but when in the deployed position the disclosed solar arrays may have a total surface area greater than the surface area of the vehicle to which they are mounted. Generated power may be used to power the vehicle and its systems, auxiliary devices, or stored for later use.

16 Claims, 9 Drawing Sheets

VEHICULAR-MOUNTED DEPLOYABLE SOLAR ARRAYS

CROSS REFERENCE TO RELATED APPLICATIONS

This application is related to and claims priority to U.S. Provisional Patent Application No. 63/502,979 filed on May 18, 2023, which is incorporated herein by reference.

FIELD

The claimed technology relates generally to sustainable energy technology and more particularly to vehicle-mounted solar energy arrays.

BACKGROUND

A number of vehicles, especially commercial vehicles, may spend long periods of time parked during periods of non-use. Such vehicles also may spend ling periods of time idling. For example, a coach bus may sit idling at a rest stop while some passengers disembark to purchase food, stretch their legs, etc. while others remain on the bus. The engine must remain running at idling speeds to power the bus climate control system during such stops which uses fuel inefficiently. Roof-mounted solar panel arrays could provide some power in such situations, however even for large commercial vehicles such as coach busses the surface area of the vehicle available for solar panels is only approximately 340 square feet. At an average of 20 watts per square foot such an array would produce only about 6800 watts under ideal conditions. There remains areas of improvement for increasing the available surface area of roof-mounted solar arrays which would allow for greater power generation while a vehicle is parked/idling.

SUMMARY

In one aspect systems and devices of a vehicle-mounted solar array which includes an expandable support frame movable between a deployed configuration and a stowed configuration, the support frame having at least one vehicle mounting member configured for mounting the support frame to the roof of a vehicle, a plurality of solar panels mounted to the expandable support frame, where each solar panel is hingeably connected to the two adjacent solar panels, such that two of the plurality of solar panels are configured to be exposed to sunlight when the expandable support frame is in the stowed configuration. The vehicle-mounted solar array further having a portion of the expandable support frame configured to extend beyond the roof of a vehicle to which it is mounted when in the deployed configuration. The vehicle-mounted solar array having eight solar panels in one configuration, such that six of the solar panels are unexposed to sunlight when the expandable support frame is in the stowed configuration. In such a configuration, the two solar panels configured to be exposed to sunlight when the expandable support frame is in the stowed configuration cover the six unexposed solar panels when the expandable support frame is in the stowed configuration. In such configuration that four of the solar panels face upwards and four of the solar panels face downwards when the expandable support frame is in the stowed configuration. Optionally the plurality of solar panels are electrically connected to one another and/or electrically connected to the vehicle to which the array is mounted.

In another aspect a vehicle-mounted solar array system and device having an expandable support frame movable between a deployed configuration and a stowed configuration, the support frame having at least one mounting member configured to mount the support frame to a vehicle roof, eight solar panels mounted to the expandable support frame, each solar panel being hingeably connected to the two adjacent solar panels, each solar panel having a generating side oppositely disposed to a support side, where two of the solar panels are configured such that their generating side is exposed to sunlight when the expandable support frame is in the stowed configuration, and where six of the solar panels are configured such that their generating side is unexposed to sunlight when the expandable support frame is in the stowed configuration. Optionally a portion of the expandable support frame is configured to extend beyond the roof of a vehicle when in the deployed configuration. Four of the solar panels may be configured such that their generating sides face downward when the expandable support frame is in the stowed configuration. Two solar panels configured to be exposed to sunlight when the expandable support frame is in the stowed configuration may be disposed such that they cover the six unexposed solar panels when the expandable support frame is in the stowed configuration. Optionally four of the solar panels generating sides face upwards and four of the solar panels generating sides face downwards when the expandable support frame is in the stowed configuration. The solar panels may be electrically connected to one another. The vehicle roof may be the roof of a recreational vehicle, a bus, a truck, a trailer, or a passenger vehicle. The vehicle-mounted solar array may further include an actuator operationally connected to the expandable support frame and configured to move the expandable support frame between the stowed and the deployed configurations. Optionally the solar panels are electrically connected to a vehicle's electrical system so as to charge the vehicle and/or power auxiliary devices and systems of the vehicle.

DESCRIPTION

Figure 1:
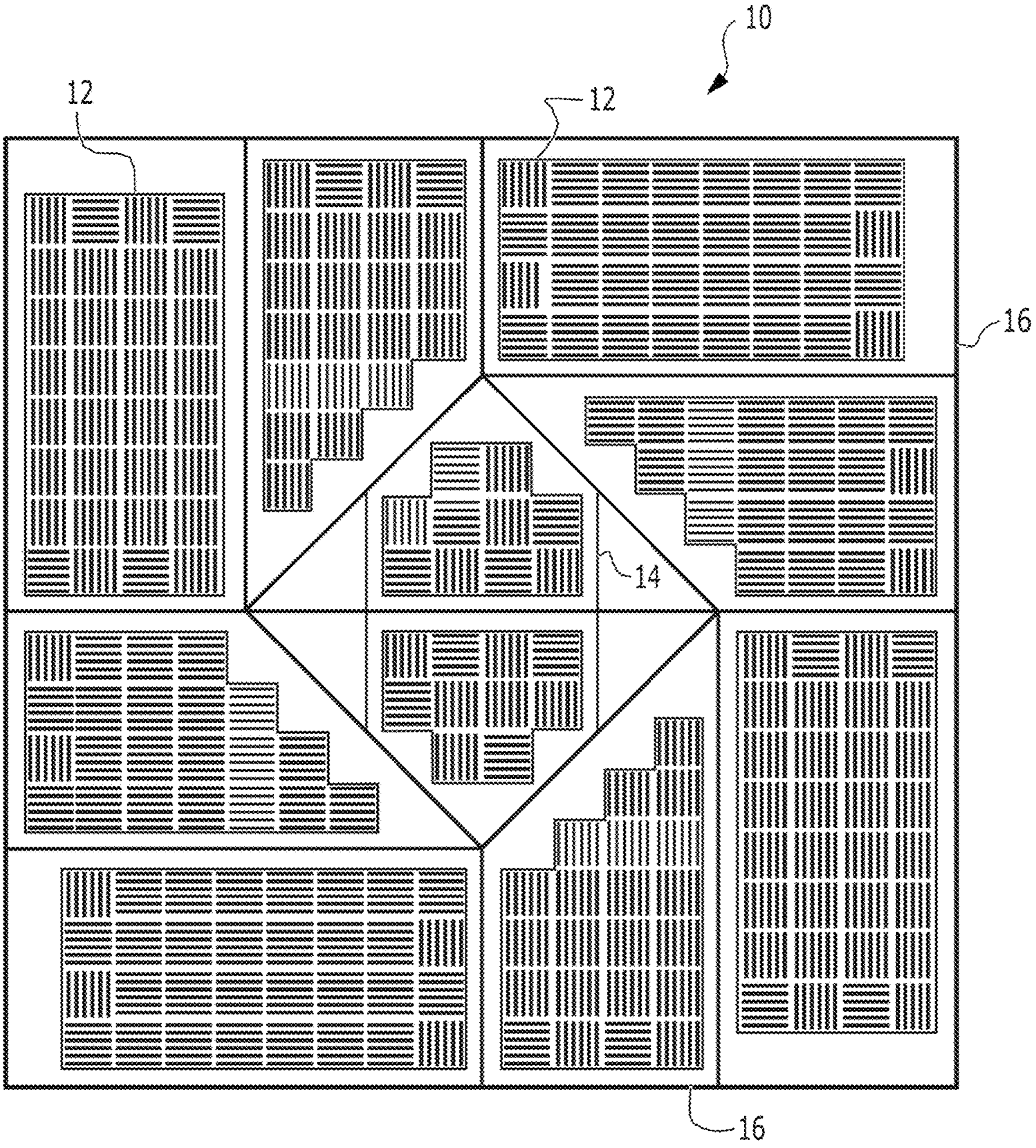
FIG. 1 is a top plan view of a deployable solar array according to one example of the disclosed technology.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would normally occur to one skilled in the art to which the claimed technology relates.

The present novel technology relates to a collapsible/deployable solar arrays for mobile applications such as mounting atop a vehicle. In one example, the shape and available surface area (and correspondingly the area of solar cells) can be reconfigured when the vehicle is stationary to increase the surface area over that when the vehicle is moving. The stowing/deploying transition (or folding/unfolding) uses interconnected panels (mechanically and electrically) and underlying scaffolding may be folded and unfolded to position the solar panels as different shapes. The disclosed solar arrays may be transitioned between the deployed and stowed configurations manually (either using hand cranks or by manually moving panels), automatically (using electric motors, actuators, or the like), or optionally both (e.g., a crank which may be manually turned or automatically turned using a motor or actuator).

The systems disclosed herein address the issue of the available surface on the roof of a typical vehicle for use to provide solar power. Because many vehicles have a relatively small surface area on the roof, roof-mounted solar arrays for vehicles typically are only capable of providing power sufficient to operate auxiliary systems (such as lights) or provide minimal charging capacity for the batteries of electric or hybrid vehicles. The novel technology described herein allows a vehicle to carry a deployable solar panel array in a smaller stowed position when the vehicle is moving that may be reconfigured into a deployed position having a much larger available surface area of solar cells.

In one example, the systems disclosed herein may provide collapsible/deployable solar arrays having at least a 2× increase in exposed and usable solar panel area between the stowed configuration and the deployed configuration. In another example, the collapsible/deployable solar arrays having at least a 4× increase in exposed and usable solar panel area between the stowed configuration and the deployed configuration. In still other examples, the collapsible/deployable solar arrays having a greater than 4× increase in exposed and usable solar panel area between the stowed configuration and the deployed configuration. In some examples, the disclosed systems still provide power from at least some solar panels when in the stowed configuration.

One advantage of the solar panel array assemblies and systems disclosed herein is that the arrays can provide for a larger useable solar surface when in the deployed configuration but occupy a smaller portion of a vehicle's total roof surface area when in the stowed configuration. Such configurability allows for roof surface area of a vehicle to be used for other things (e.g. removable storage containers/storage racks) when the solar array is stowed but still provide for larger solar array area when desired in the deployed configuration. In some examples, the solar panel array assemblies and systems may also include a partially deployed configuration. Such systems would have a deployed configuration with the largest exposed solar array surface area, a stowed configuration having the smallest exposed solar array surface area, and one or more partially deployed configurations having total exposed solar array surface area(s) somewhere between the fully deployed and stowed configurations. Such assemblies may be useful on vehicles such as recreational vehicles where users at various times might want to maximize solar generation (fully deployed), maximize available roof area (stowed configuration) such as when driving, and have increased solar generation while still having some use of the vehicle's roof (partially deployed configuration) such as for storage or for elevated seating while parked.

The examples provided herein discuss vehicle-mounted deployable solar arrays as being mounted to buses, particularly to coach style busses. This is for illustrative purposes only. The technology described herein may be adapted for use with any mobile vehicle or platform including, but not limited to buses (coach, school, shuttle, and the like), trucks (commercial tractor trailers, panel trucks, box trucks, pickups, SUVs, and the like), passenger vehicles, recreational vehicles, campers, trailers, and any other mobile platform or vehicle which could benefit from having electrical power generated thereon. In some examples, power generated by the disclosed systems may be used to power auxiliary devices or systems (lights, HVAC systems, refrigeration, heating/cooking systems, entertainment systems, and the like), to transfer power to the vehicle's batteries for later use (to power auxiliary systems/devices later or to power the vehicle itself), and/or for transfer to a power grid or separate power storage system (e.g., stand-alone battery systems).

Figure 2:
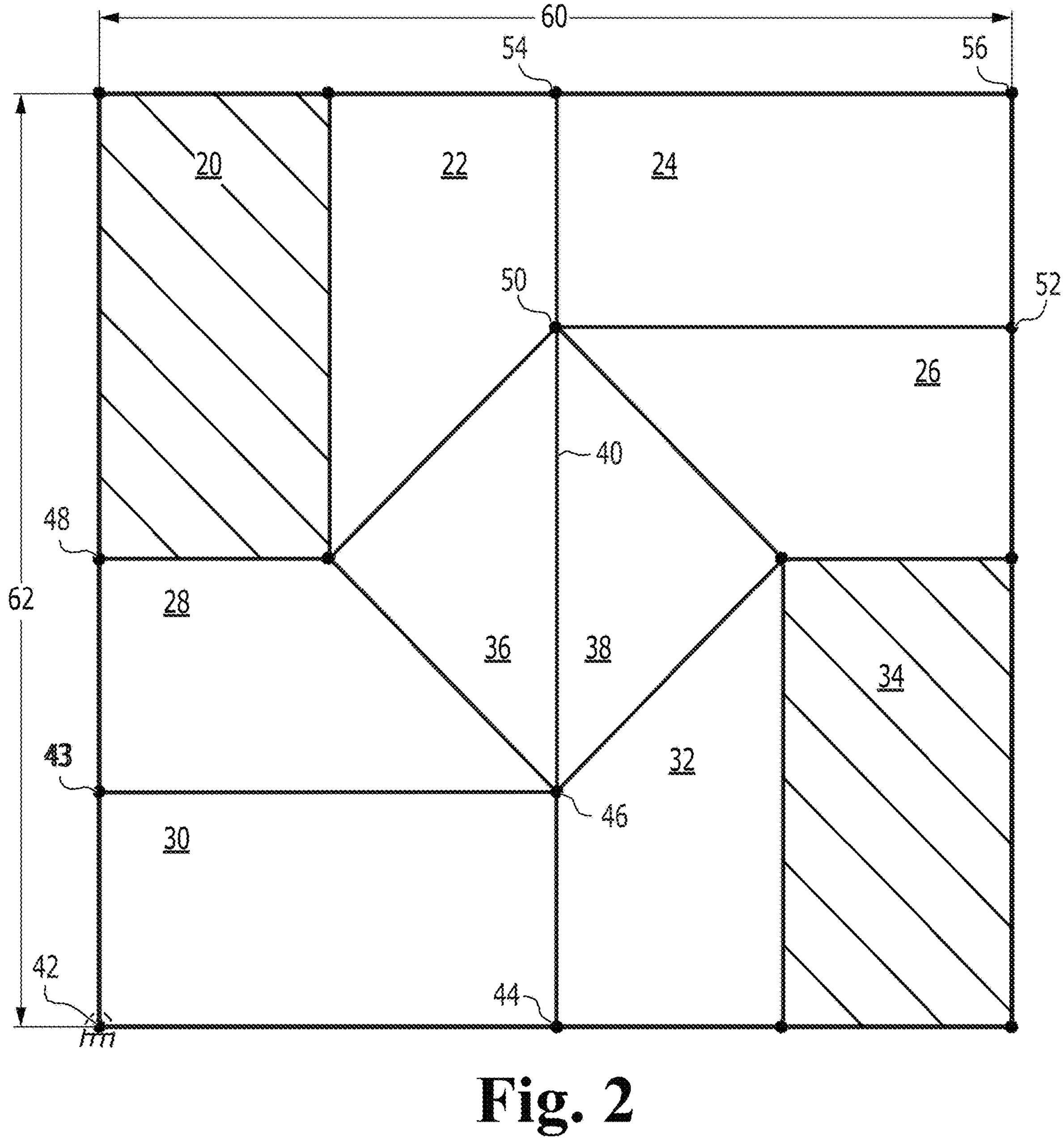
FIG. 2 is diagrammatic view of the deployable solar array shown in FIG. 1 in the deployed configuration.

The examples of vehicle-mounted solar arrays described herein are shown as having eight individual solar panels (FIG. 10-12) and ten individual solar panels (FIG. 1-2). In other examples, arrays which incorporate the disclosed technology may have more or fewer than eight or ten individual solar panels. More panels could be added to the disclosed arrays and still fall within the scope of the described novel technology. Optionally, the arrays shown in FIGS. 1-2 and 10-12 could be made having one or more panels inserted without solar cells. For example, a six solar panel array could be made using the design shown in FIG. 10-12 where panel 118 and 116 were made having only a support side and lacking a generating side having solar cells. Such a configuration might be suitable for applications which required a lower generating capacity without having to redesign the array frame or alter the assembly process.

In one example, electric or hybrid school busses adapted to include the disclosed technology could operate in the morning picking up pupils, park during the school day with their solar arrays in the deployed configuration to recharge their batteries, then use that captured energy to take pupils home after the school day has ended, then park in the deployed configuration so as to again recharge their batteries in the afternoon for the next school day. Vehicles which have similar patterns of use (long periods of being parked between periods of operation) could also benefit from the disclosed technology. Examples might include special purpose busses (blood drive buses, mobile health units, disaster response units, and the like), recreational vehicles, job site trailers, animal trailers, and the like.

One novel feature of the disclosed technology is the increase in available solar panel surface area over the straightforward mounting of solar panels on the vehicle's exposed rooftop surface area and/or layers or slides for the deployment of solar panels. In some applications, the disclosed solar panel arrays may be deployed as an awning on vehicles such as campers or recreational vehicles to provide shade. In other applications, the disclosed solar panel arrays may be configured to include piping and drains so as to collect rainwater which falls on them in either the deployed or stowed configuration.

Figure 3:
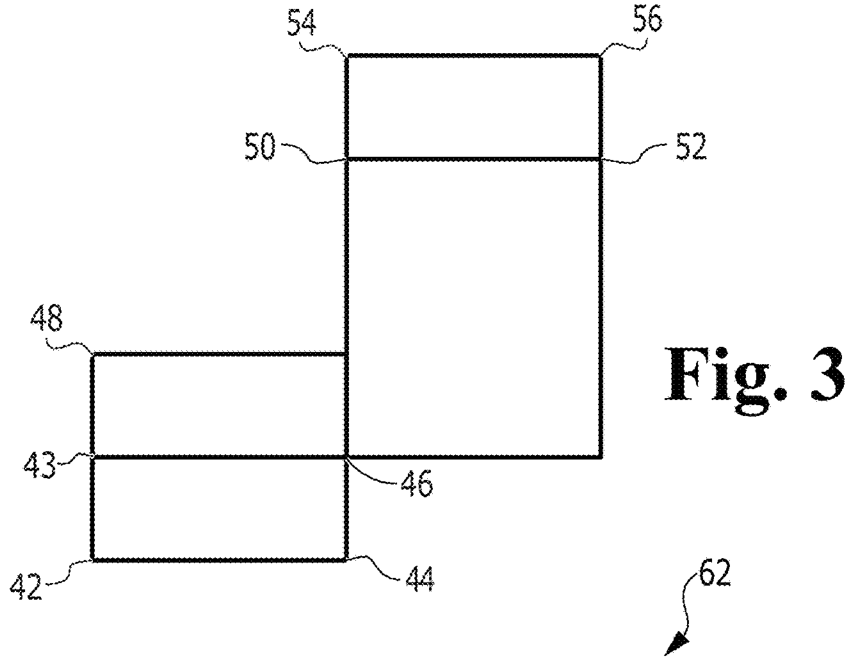
FIG. 3 is a diagrammatic view of the support frame for the deployable solar array shown in FIG. 1 in the stowed configuration.

One example of a vehicle mounted deployable solar array system 10 is shown in FIG. 1 in the deployed configuration. In this particular example, a plurality of solar panels 12 are mounted to frame members 16. The frame members 16 in turn are all operationally connected to a central frame 14 which is configured for mounting to the roof of a vehicle. Each of the solar panels 12 are in electrical communication with one another and with a separate electrical system such as the electrical system of a vehicle or to a stand-alone battery storage system. A diagrammatic view of the solar array 10 of FIG. 1 is shown in the deployed configuration (FIG. 2) and in the stowed configuration (FIG. 3). Each solar panel 12 is mounted to a movable frame member 16 similar to those shown in FIG. 4-5 as described below.

When in the deployed configuration (FIG. 1-2) each of the individual solar panels 20, 22, 24, 26, 28, 30, 32, 34, 36, 38 are exposed to the sun. When in the stowed configuration (FIG. 3) portions of some solar panels cover portions of other solar panels so as to decrease the total exposed surface area of solar panels thereby decreasing the total covered area of the vehicle roof/top. A number of support frame vertices 42, 43, 44, 46, 48, 50, 52, 54, 56 are arranged in a deployed configuration (FIG. 2) and in a stowed configuration (FIG. 3).

Figure 4:
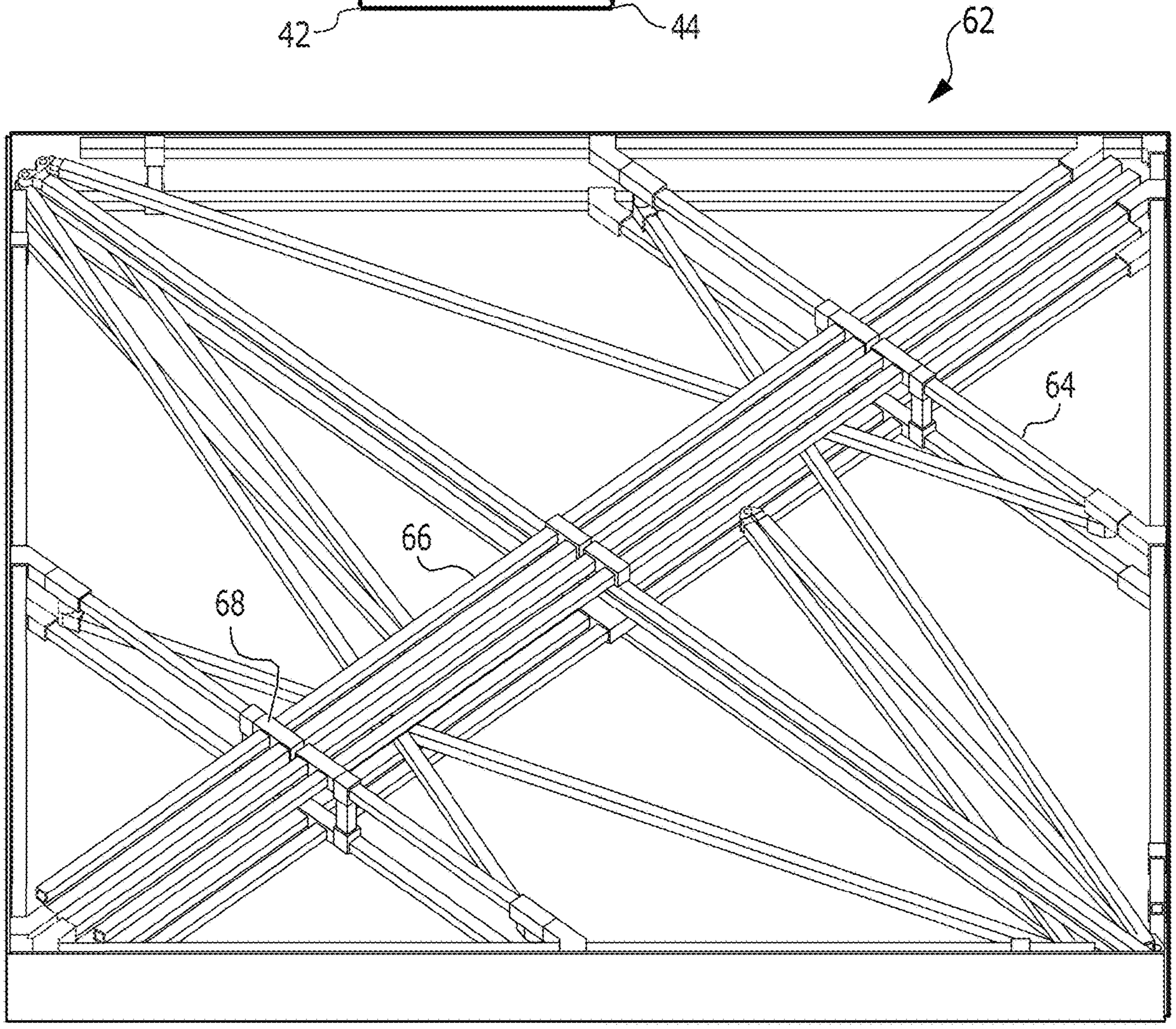
FIG. 4 is a perspective view of an expandable framework for a deployable solar array cording to one example of the disclosed technology in the stowed configuration.
Figure 5:
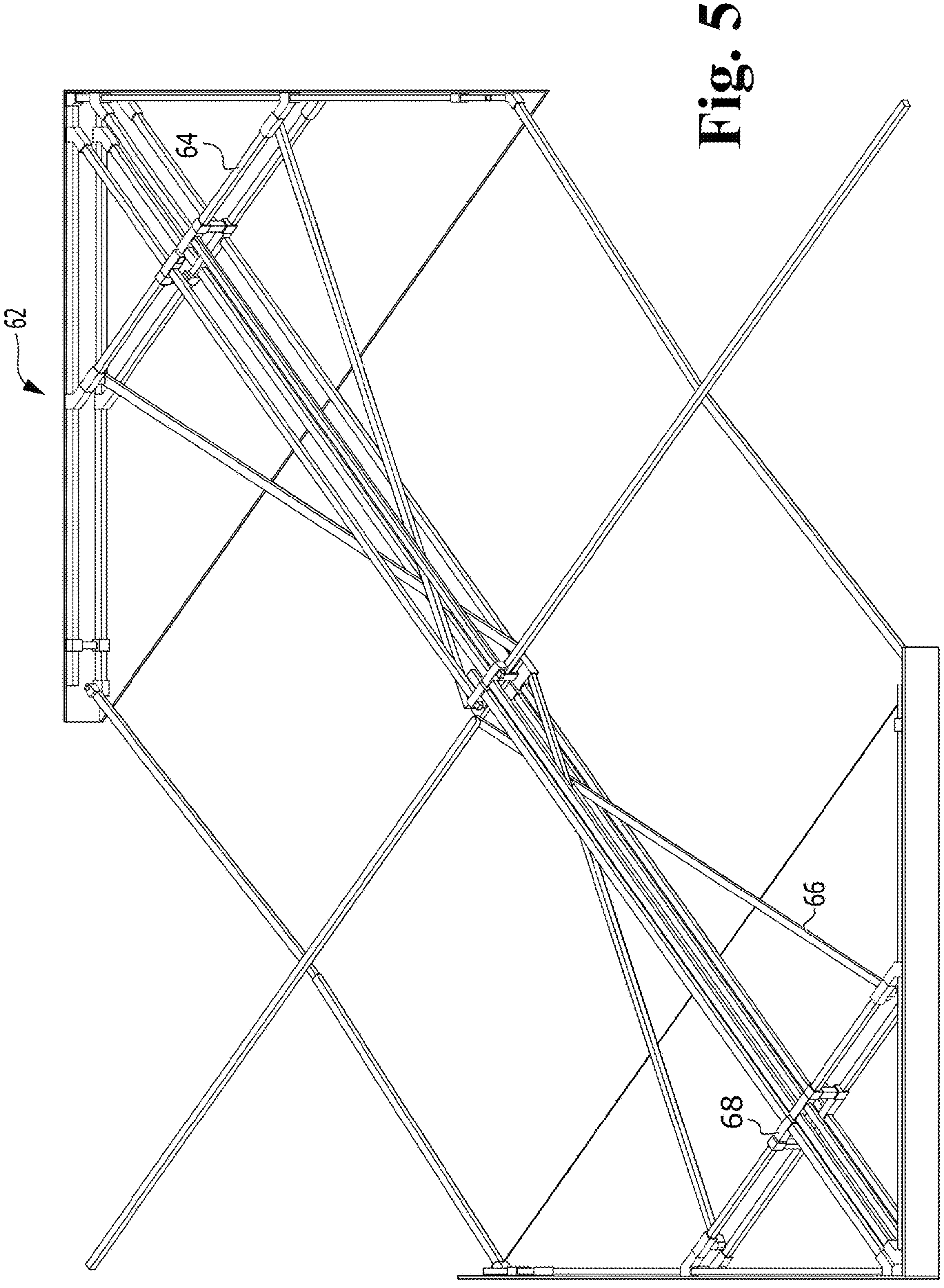
FIG. 5 is a perspective view of the expandable framework shown in FIG. 2 in the deployed configuration.

As shown in FIG. 4-5, a support frame 62 mountable to a vehicle roof is also included in the disclosed vehicle mounted solar array systems. In this example the frame 62 includes a plurality of first/vertical members 66 and a plurality of second/cross members 64. A sliding bracket 68 allows a vertical member 66 and a cross member 64 to move past one another when transitioning between the deployed configuration (FIG. 5) and the stowed configuration (FIG. 4).

Figure 6:
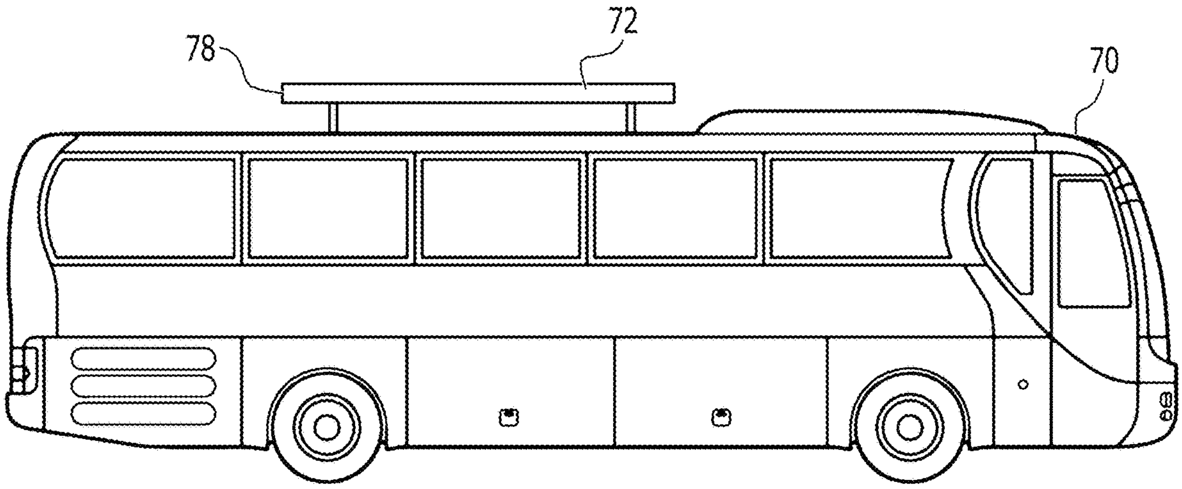
FIG. 6 is a side view of a deployable solar array according to one example of the disclosed technology mounted to the roof of a bus in the stowed position.
Figure 7:
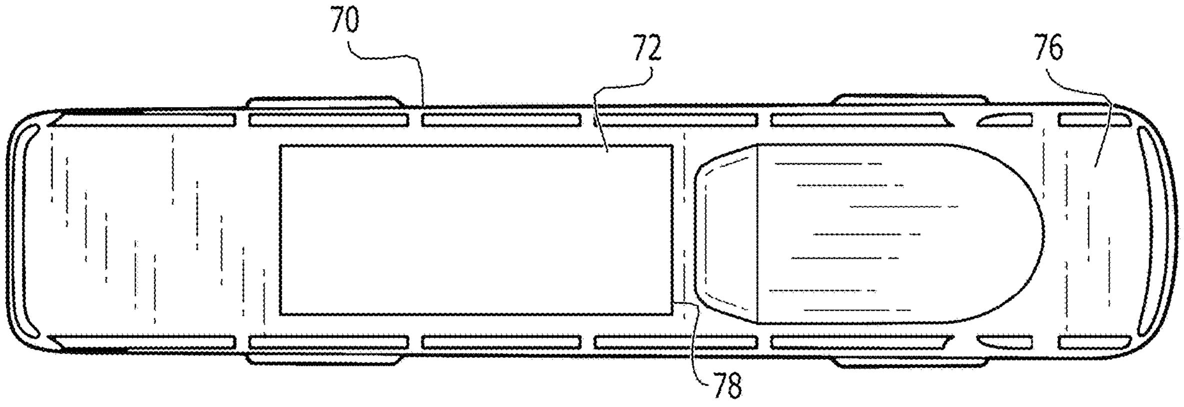
FIG. 7 is a top plan view of the deployable solar array shown in FIG. 6.
Figure 8:
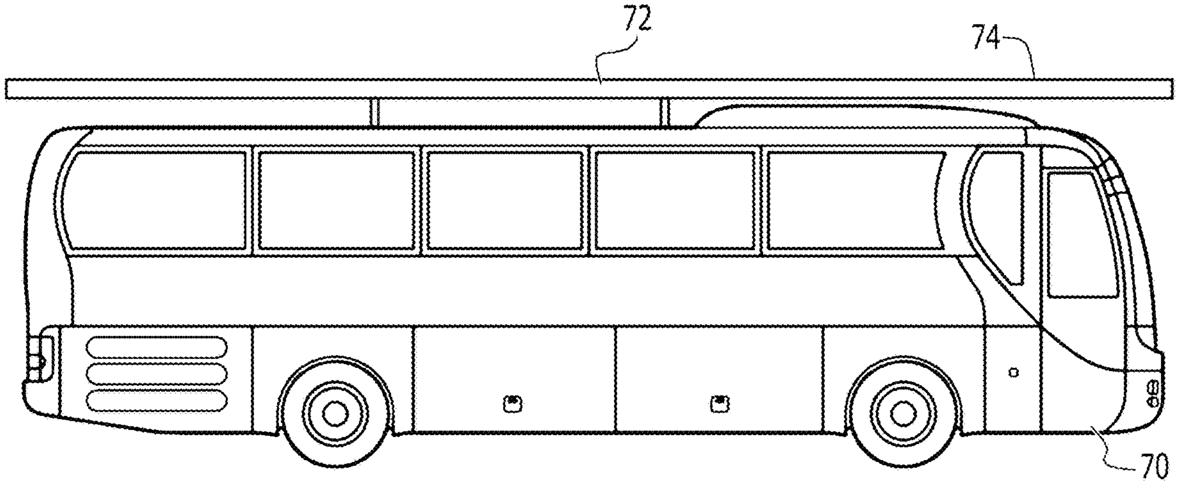
FIG. 8 is a side view of a deployable solar array according to one example of the disclosed technology mounted to the roof of a bus in the deployed position.
Figure 9:
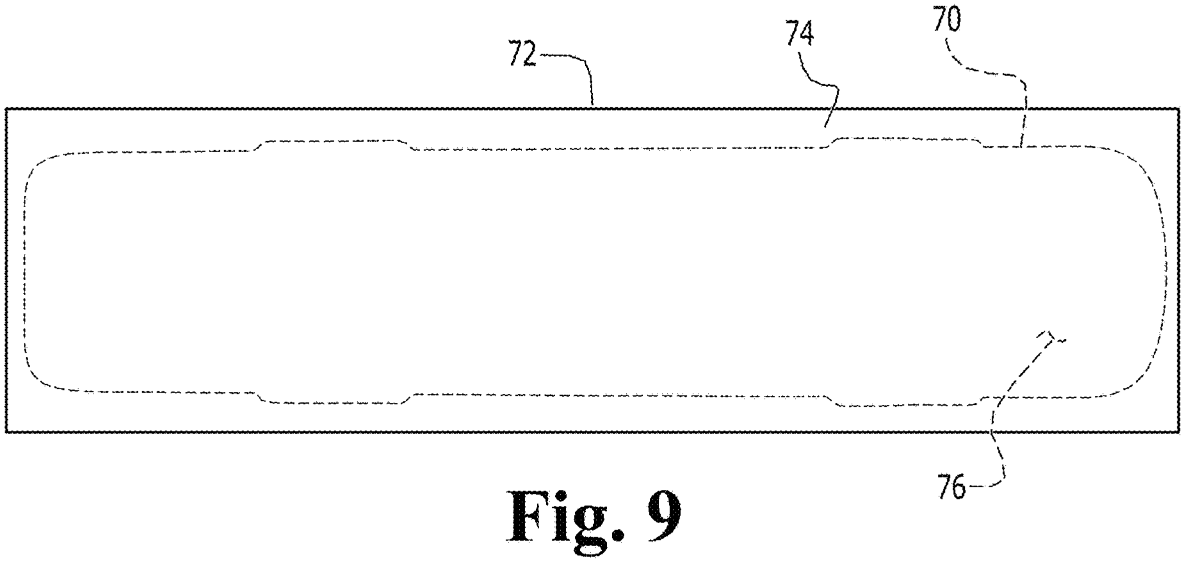
FIG. 9 is a top plan view of the deployable solar array shown in FIG. 8.

FIG. 6-9 shows a bus 70 having a roof-mounted solar array 72 according to one example of the disclosed technology. As seen in FIG. 6-7 the array 72 is in the stowed position 78 and fits within the surface area of the vehicle roof 76. When in the deployed configuration 74 as seen in FIG. 8-9 the array 72 extends beyond the surface area of the roof 76. In this particular example, the deployed array extends beyond the front, rear, and both sides of the vehicle roof equally. In other examples, the deployed array may extend beyond one side more than the other (or not at all) so as to form a screening canopy to provide a shaded area adjacent to the vehicle.

Figure 10:
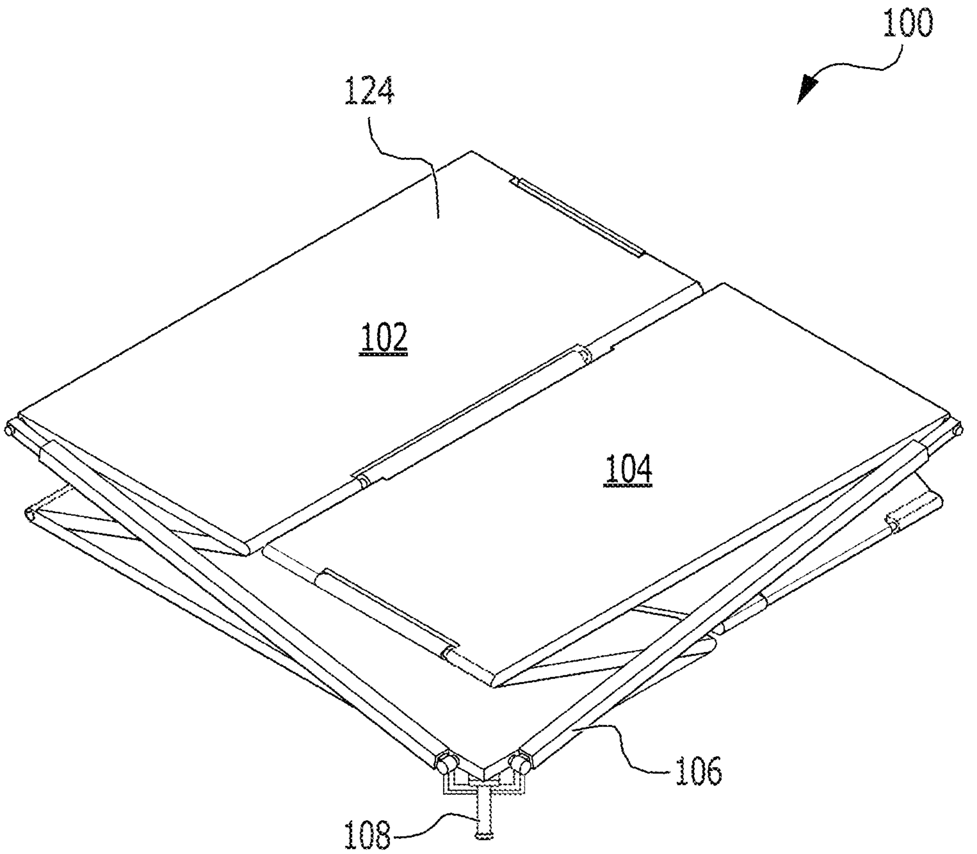
FIG. 10 is a perspective view of a deployable solar array according to one example of the disclosed technology in the stowed configuration.
Figure 11:
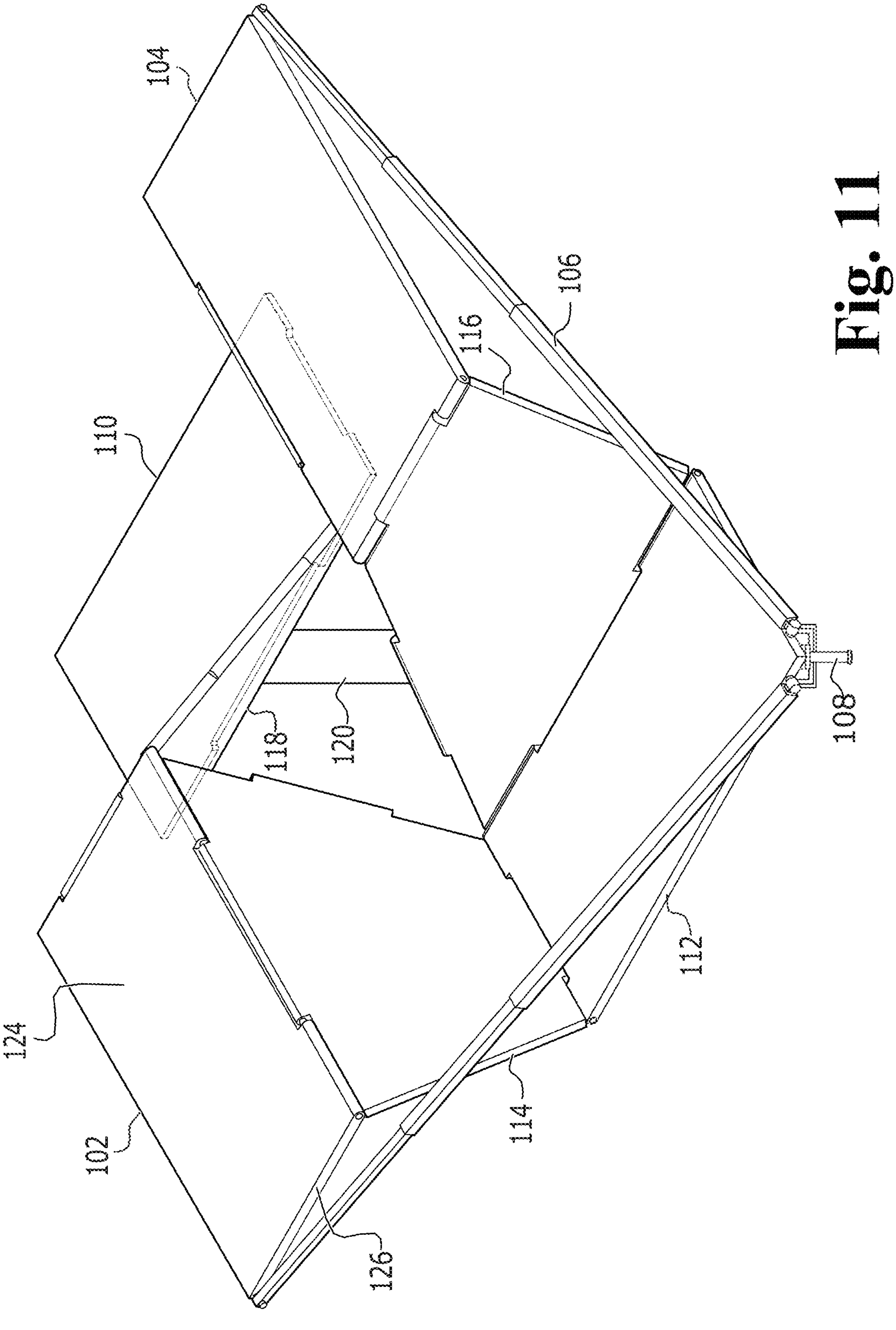
FIG. 11 is a perspective view of the deployable solar array of FIG. 10 in a partially deployed configuration.
Figure 12:
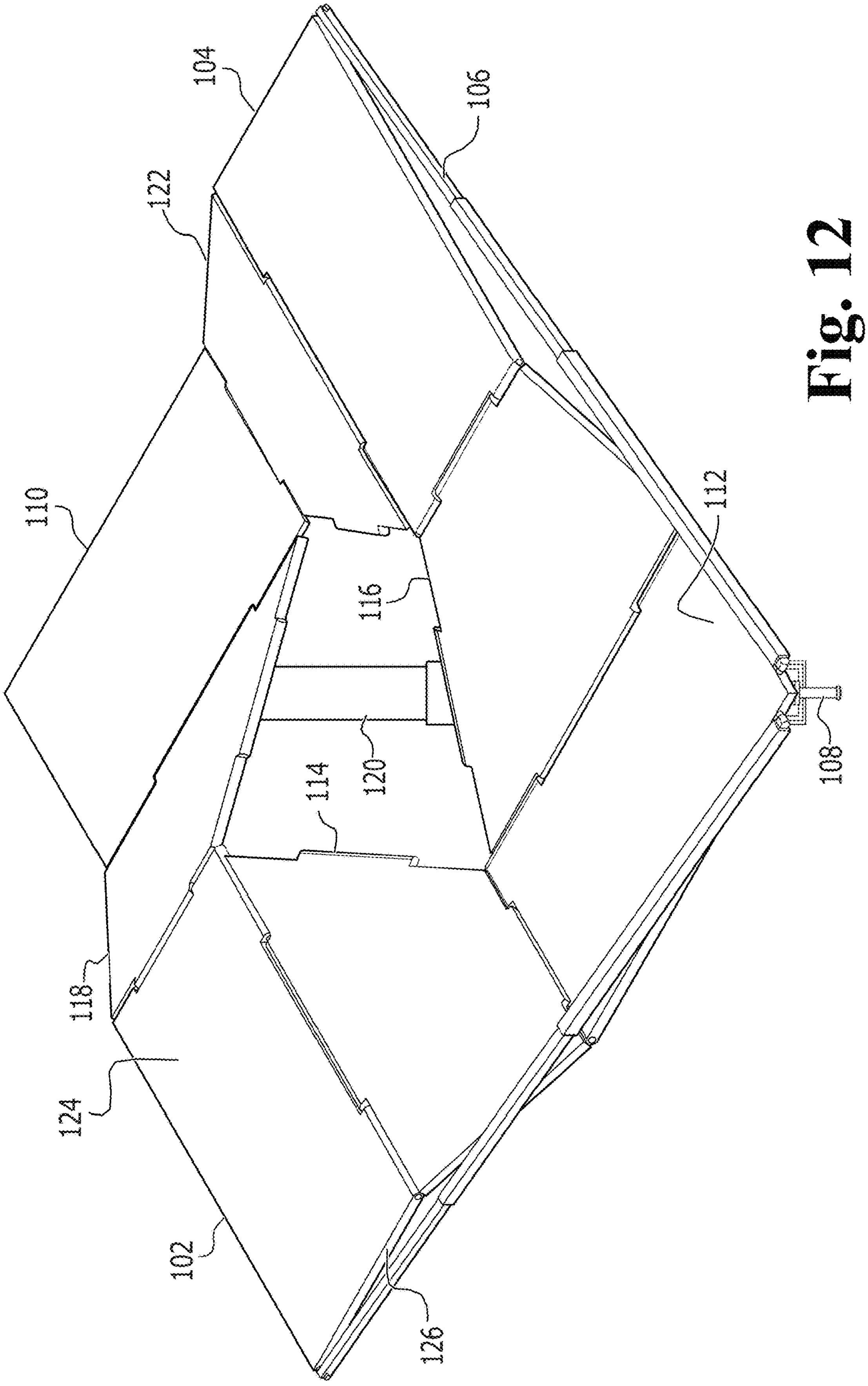
FIG. 12 is a perspective view of the deployable solar array of FIG. 10 in a partially deployed configuration.

Another example of a vehicle-mounted deployable solar array 100 is shown in FIG. 10-12. In this particular example, the solar array 100 comprises eight individual solar panels 102, 104, 110, 112, 114, 116, 118, 122. Each individual solar panel is operationally connected to two adjacent panels. For example, panel 102 is operationally connected to panel 118 and panel 114. In this particular example, operationally connected means mechanically/hingeably connected as well as electrically connected. One or more of the individual panels may be mechanically mounted to a frame 106 similar to those previously described. The frame includes one or more mounting members 108 configured for removably mourning the array 100 to a vehicle as previously described.

Each of the individual solar panels 102, 104, 110, 112, 114, 116, 118, 122 has a first (generating) side configured to generate electricity when exposed to sunlight and a second (support) side which acts as a support/backing and does not generate electricity when exposed to sunlight. For example, panel 102 has a first side 124 which is always upward facing (i.e., towards the sky) no matter the configuration of the solar array 100 (deployed, partially deployed, or stowed). In this particular example, panels 102 and 104 always have their generating side facing upward such that they are capable of generating electricity regardless of the array's 100 present configuration. This arrangement allows for the solar array 100 to produce some amount of electricity even when the array is in the stowed configuration such as while the vehicle is being driven. Panels 110, 112, 114, 116, 118, 122 are configured such that they are not capable of generating electricity when the array is in the stowed position. Additionally, panels 110, 112, 114, 116, 118, 122 may be capable of generating some amount of electricity when the array is in the partially deployed position. When in the stowed position, the generating side of panels 110, 112, 114, 116, 118, 122 are blocked from a path to the sky. Particularly, the generating side of panels 114, 116, 118, 122 are configured to face downward/away from the sky when the array 100 is in the stowed configuration. The generating side of panels 110, 112 are covered by part or all of one or more panels when the array is in the stowed configuration and have no line of sight to the sky. In the stowed configuration in this example only two panels 102, 104 are exposed which protects the other panels 110, 112, 114, 116, 118, 122 may be capable of generating some amount of electricity when the array is in the partially deployed position. When in the stowed position, the generating side of panels 110, 112, 114, 116, 118, 122 from damage from weather (e.g., hail) and road hazards (e.g., rocks kicked up by other vehicles). The exact dimensions of the array 100 generally and individual panels 102, 104, 110, 112, 114, 116, 118, 122 may vary as desired such that smaller arrays may be mounted to passenger vehicles, SUVs, and the like and larger arrays mounted to larger or commercial vehicles such as buses and recreational vehicles. Optionally, two or more individual arrays may be mounted to a larger vehicle to give a user flexibility to deploy/stow individual arrays as needed.

While the claimed technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the claimed technology are desired to be protected.

What is claimed is:

1. A vehicle-mounted solar array, comprising:

an expandable support frame movable between a deployed configuration and a stowed configuration and having a vehicle mounting member; and a plurality of at least three solar panels mounted to the expandable support frame and arranged in a closed loop, each solar panel of the plurality of solar panels being hingedly connected to two adjacent solar panels of the plurality of solar panels;

wherein two of the plurality of solar panels are configured to be exposed to sunlight when the expandable support frame is in the stowed configuration.

2. The vehicle-mounted solar array of claim 1, wherein a portion of the expandable support frame is configured to extend beyond the roof of a vehicle when in the deployed configuration.

3. The vehicle-mounted solar array of claim 1, wherein the plurality of solar panels comprises eight solar panels.

4. The vehicle-mounted solar array of claim 3, wherein six of the solar panels are unexposed to sunlight when the expandable support frame is in the stowed configuration.

5. The vehicle-mounted solar array of claim 4, wherein the two solar panels configured to be exposed to sunlight when the expandable support frame is in the stowed configuration cover the six unexposed solar panels when the expandable support frame is in the stowed configuration.

6. The vehicle-mounted solar array of claim 4, wherein four of the solar panels face upwards and four of the solar panels face downwards when the expandable support frame is in the stowed configuration.

7. The vehicle-mounted solar array of claim 1, wherein the plurality of solar panels are electrically connected to one another.

8. A vehicle-mounted solar array system, comprising:

an expandable support frame movable between a deployed configuration and a stowed configuration and having a mounting member configured to mount the support frame to a vehicle roof;

eight solar panels mounted to the expandable support frame, each solar panel being hingedly connected to the two adjacent solar panels, each solar panel having a generating side and a support side;

wherein two of the solar panels are configured such that their generating side is exposed to sunlight when the expandable support frame is in the stowed configuration;

wherein six of the solar panels are configured such that their generating side is unexposed to sunlight when the expandable support frame is in the stowed configuration.

9. The vehicle-mounted solar array system of claim 8, wherein a portion of the expandable support frame is configured to extend beyond the roof of a vehicle when in the deployed configuration.

10. The vehicle-mounted solar array system of claim 8, wherein four of the solar panels are configured such that their generating sides face downward when the expandable support frame is in the stowed configuration.

11. The vehicle-mounted solar array system of claim 8, wherein the two solar panels configured to be exposed to sunlight when the expandable support frame is in the stowed configuration cover the six unexposed solar panels when the expandable support frame is in the stowed configuration.

12. The vehicle-mounted solar array system of claim 8, wherein four of the solar panel generating sides face upwards and four of the solar panels generating sides face downwards when the expandable support frame is in the stowed configuration.

13. The vehicle-mounted solar array system of claim 8, wherein the solar panels are electrically connected to one another.

14. The vehicle-mounted solar array system of claim 8, wherein the vehicle roof is the roof of a recreational vehicle, a bus, a truck, a trailer, or a passenger vehicle.

15. The vehicle-mounted solar array system of claim 8, further comprising an actuator operationally connected to the expandable support frame and configured to move the expandable support frame between the stowed and the deployed configurations.

16. The vehicle-mounted solar array system of claim 8, wherein the solar panels are electrically connected to a vehicle's electrical system.

* * * * *